Feb. 6, 1945.  H. J. SEIDEL ET AL  2,369,077
VIBRATION DAMPING SUSPENSION
Filed Oct. 10, 1940
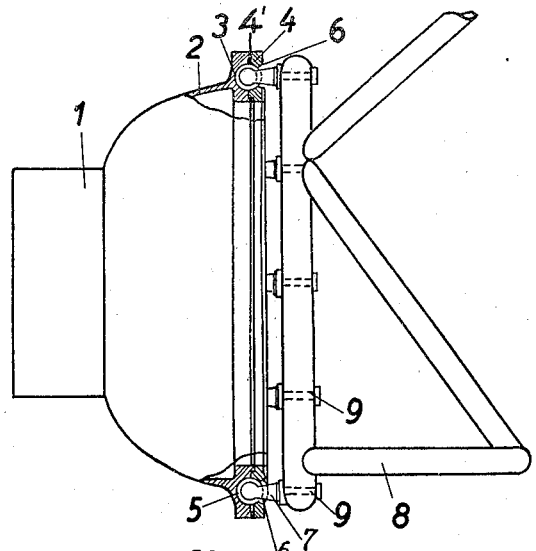
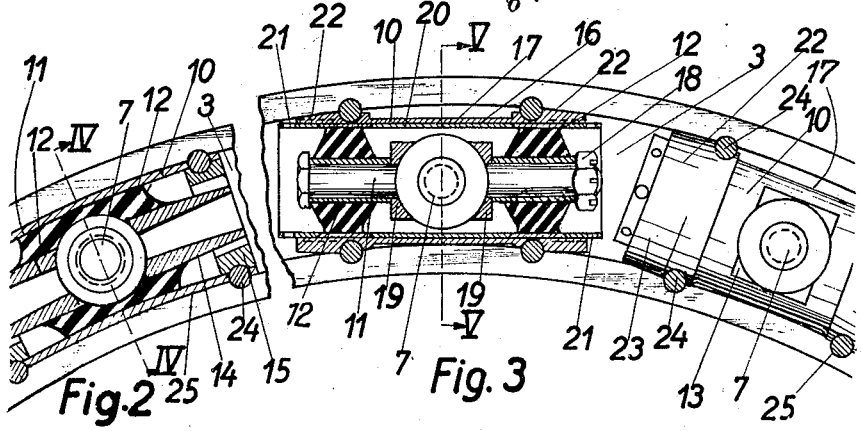
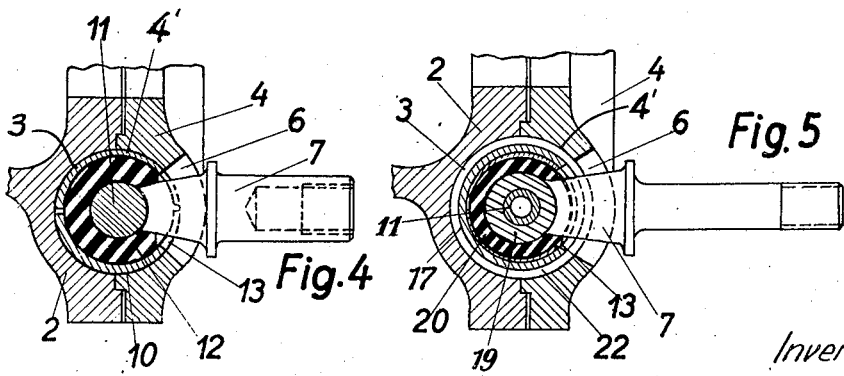
Inventors
Hans Joachim Seidel and Adolf Weiler
by Knight Bros
attorneys Patented Feb. 6, 1945

2,369,077

UNITED STATES PATENT OFFICE 2,369,077

VIBRATION DAMPING SUSPENSION

Hans Joachim Seidel, Berlin-Wilmersdorf, and Adolf Weiler, Berlin-Spandau, Germany; vested in the Alien Property Custodian Application October 10, 1940, Serial No. 360,688
In Germany October 18, 1939

5 Claims. (Cl. 248—5)

The invention relates to a suspension of power plants or of similar installations producing vibrations, particularly aircraft power plants by means of sleeve type springs, preferably with rubber as resilient material. The sleeve type rubber springs embrace a carrier bolt in such a manner that a direct connection between bolt and rubber sleeve is not necessary.

Suspensions of this kind are already known per se. With these ararngements the sleeve type rubber springs are connected with the engine installation serving for mounting the power plant into the cell and provision is made on the casing of the power plant to receive the mounting bolts. This mode of suspension has the disadvantage, that it is mechanically unfavourable for connecting the mounting bolts with the casing parts which are preferably made of light metal or corresponding alloys, for in such cases the points of application of the mounting bolts at the casing must be strengthened for a more favourable transmission of power in order to avoid a breakage of the bolt and/or a damage to the casing. Further, different manufacturing works design the cells to correspond to certain engine installations, each manufacturer preferring a particular embodiment of the rubber spring type suspension points. This means that in many cases it is not feasible to mount the same power plant into different cells, as an exchange of the rubber spring is not always possible. This may lead to difficulties specially in war-time service since a storing of the different rubber springs becomes necessary.

These disadvantages are avoided, according to the invention, by the fact that the rubber springs form a part of the power plant. A particularly simple construction is provided by applying the sleeve type springs in a preferably circular groove provided in the engine crankcase or in an essential part of it.

This circular groove is closed by a closing device like a cover. In this closing device apertures are provided through which the mounting bolt, being articularly or rigidly connected with the carrier bolt, projects. In this manner the sleeve type springs forming constituent parts of the crankcase and thus of the power plant can be designed from the first in such a way that no resonance vibrations of the power plant occur within the range of operating speed of rotation of engine and propeller.

Preferably the sleeve type springs are not equally spaced in the circular groove, but arranged, according to the desired elasticity of the engine installation with respect to the wing of the aircraft, in relation to the vertical and the transversal axes so that natural frequencies of both the said axes possibly coincide. In this manner the differences in the elasticity of the engine installation can almost be compensated in these directions of axes. This distribution of the sleeve type springs can be adapted subsequently to the actual engine installation or predetermined already from the first. Further owing to the insertion of the complete sleeve type spring into the crankcase the mechanical structure of the suspension becomes considerably more favourable, as now the forces are transmitted from the crankcase and distributed over the large surface of the sleeve so that any local overstressing of the crankcase no longer occurs. Since at the same time the sleeve springs have become constituent parts of the engine, it is possible to mount the same power plant in different cells.

The structural details of the sleeve type springs mounted in the approximately circular recess and fitted to be closed by a cover may be seen from the following description. The drawing shows the invention with its essential parts in two examples of construction, in which Fig. 1 is a side view of the suspension partly in section;

Fig. 2 is a circular arrangement of a sleeve type spring in section;

Fig. 3 is a view of another form of circular arrangement of the sleeve type spring with the cover plate removed, partly in section.

Fig. 4 is a section on the line IV—IV of Fig. 2.

Fig. 5 is a section on the line V—V of Fig. 3.

As illustrated in the drawing (Fig. 1), the crankcase 1 of the engine has a bell-shaped part 2 provided on its periphery with a circular groove 3 which is semi-circular in cross-section. The part 2 is covered by a circular plate 4 suitably attached to the part 2 and provided on its periphery with a groove 4' which is semi-circular in cross-section (Fig. 4) and co-operates with the groove 3 to form a circular channel between the part 2 and cover 4, which is circular in cross-section. A plurality of sleeve type springs 5 are mounted in this channel, suitably distributed about the circumference of the part 2. The cover plate 4 has a plurality of apertures 6 communicating with the channel between parts 2 and 4, through which extend bolts 7 from the springs 5 respectively, and which are bolted at 9 to the supporting frame 8.

The sleeve type spring comprises in a manner known per se and as shown in Fig. 2 a sleeve 10 and a carrier bolt 11 to which a resilient material, preferably rubber, is bonded. The mounting bolt 7 is specially put on the carrier bolt 11 or forms one piece with it. The mounting bolt 7 projects through a recess 13 of the sleeve 10, as can be seen in Figs. 4 and 5.

In order to mount such sleeve type springs in the circular groove 3 of the bell-shaped part 2 of the crankcase, the carrier bolt 11 is, as to be seen in Fig. 2, curved in conformity with the curvature of the circular groove 3 and provided at its ends preferably with cylindrical extensions 14. The surface of the sleeve 10 is shaped to conform to the curvature and circular cross-section of the channel formed by the grooves 3 and 4' and split for the introduction of the carrier bolt 11 which in the example of construction is made of one piece with the mounting bolt 7, the division plane running in the direction of the axis of the mounting bolt. In this manner it is possible to insert the mounting bolt 7 together with the carrier bolt 11 into the divided sleeve and to secure the rubber cover 12 by vulcanizing, so that all parts of the sleeve type spring form a self-contained unit. The interior bore of the sleeve 10 is preferably cylindrical at its ends, the axis of the bored sleeve 10 coinciding with the axis of the cylindrical extensions 14 of the carrier 11. These coinciding axes of the sleeve 10 and the extensions 14 of bolts 11 are tangent to the circle concentric with the circular channel in which the springs 5 are mounted, and which passes through the center of the circular cross section of the channel.

The bore at the ends of the sleeve 10 and the extensions 14 serve for screwing in or for inserting special abutments in the shape of rings 15. The inner width of these rings is large enough that during normal operating conditions the carrier bolt 11 with its extensions 14 is nowhere abutting. With growing stresses, i. e., through static stresses due to the influence of external forces, e. g., propeller traction, torque or during levelling up the airplane, the extensions 14 of the carrier bolt 11 abut against the annular stops 15. In this way forces, e. g., below 1.5 resp. 2.5 g. are transmitted, without interfering with the rubber cover, directly to the suspension points, so that the rubber is dealt with sparingly. If such limiting stops would be lacking, there would be the danger of the rubber cover becoming destroyed or at least slackened from its assembly.

Instead of adapting the entire surface of the sleeve 10 to the shape of the recess 3, it is also possible, as shown by the example of construction in Fig. 3, to provide the sleeve with a rectilinear cylindrical bore and, e. g., to turn down the middle part of the sleeve on its outer surface at 17, so that the sleeve is not abutting the groove 3. Into the bore 16 of the sleeve the carrier bolt 11 together with the mounting bolt 7 is inserted and the spring elements 12 are put on to both ends of the carrier bolt 11 and fixed by screwing up the nuts 18.

Between the mounting bolt 7 and each spring element 12 an abutment 19 is provided on the bolt 11. Both these abutments 19 can abut on the interior wall of the sleeve 10 and have the same object as the annular abutments 15 of the example of construction in Fig. 2. The arrangement of these abutments in the immediate vicinty of the mounting bolt 7 has the advantage, that the bending movements, in the case of the abutments on the carrier bolt 11 becoming effective, will remain small in amount.

The spring elements 12 are in this example of construction independent structural parts and are inserted into the inner bore 16 of the sleeve 10 against the ends, respectively, of a spacing ring 20 provided in the bore 16. The spring elements 12 are held in the sleeve 10 preferably by annular screw members 21 screwed into the sleeve 10, and, according to the position of these two screw members 21, the spring elements can be so adjusted or displaced that the mounting bolt 7 occupies a predetermined position in the recess 6 of the cover plate 4. The subdivision of the resilient material in two independent spring elements has the advantage that the characteristics of resiliency can be kept lower with approximately the same spring volume and that further the ratio of the characteristics of resiliency in transverse direction to that in longitudinal direction becomes smaller. This is essential for the purpose of obtaining low natural frequencies.

In the form of the device illustrated in Fig. 3, the sleeve 10 is provided at each end with an enlarged portion 22 having its outer surface 23 suitably shaped to conform to both the curvature and cross-sectional configuration of the groove 3 so that the portions 22 have their entire outer surfaces 23 in contact with the wall of the groove 3. In the form of Fig. 3, the axes of the sleeves 10 and the bolts 11 coincide and are tangent to a circle concentric with the groove 3 and passing through the center of its cross-section. The sleeves 10 may be fixed in the groove 3 by bolts 24 engaging in recesses 25 in the portion 22.

While there is illustrated in the drawing a groove 3 which is circular, it is to be understood that the groove 3 may be only partially circular, and in such a groove the sleeve type springs 5 could be mounted.

The circular form, however, has the advantage, that the sleeve type springs 5 can be arranged in the groove 3 at will. There is further the possibility of fastening the cover plate 4 by means of the mounting bolts 24 simultaneously securing the position of the sleeve type springs 5.

We claim:

1. In a vibration-damping suspension, the combination of a supporting structure; a suspended structure, one of said structures being provided with a groove; a plurality of suspension members interposed between said structures, each of said members comprising a sleeve, a bolt disposed within said sleeve, and resilient means interposed between said sleeve and said bolt, the sleeve being received in said groove in the one structure; means to retain the sleeves in the groove; and a carrier bolt connecting the bolt of each of the suspension members and the other of said structures.

2. In a vibration-damping suspension, the combination of a supporting structure; a suspended structure provided with a circular groove, semi-circular in cross-section; a plurality of suspension members, each comprising a sleeve, a resilient member mounted in said sleeve, and a bolt mounted in said resilient member, the sleeve having an outer surface conforming to the curvature and cross-section of said groove, and being disposed therein; means to retain the sleeves in the groove; and a carrier bolt connecting the bolt of each suspension member and the supporting structure.

3. In a vibration-damping suspension, the combination of a supporting structure; a suspended structure having a circumferential channel; a plurality of suspension members, each comprising a sleeve, a bolt in the sleeve and a resilient connection between the sleeve and the bolt, each sleeve being provided on its ends with enlarged portions, the outer surfaces of which are shaped to conform to the curvature of said channel, the sleeves being disposed in the channel; and the longitudinal axes of the sleeves being tangent to a circle concentric with the channel; means to retain the sleeves in the channel; and connecting means between the bolt of each member and the supporting structure.

4. In a vibration-damping suspension, the combination of a supporting structure; a suspended structure provided with a circular groove, semi-circular in cross-section; a cover member removably attached to said suspended structure and having a plurality of apertures communicating with said channel, and a circular groove, semi-circular in cross-section, the grooves being so designed and related, when the cover is attached, as to form a circular channel, circular in cross-section; a plurality of suspension members mounted in said channel, each of said suspension members having a sleeve having an exterior configuration conforming to the curvature of said channel, a resilient member mounted in said sleeve, and a bolt mounted in said resilient member; and a carrier bolt connected to the bolt of each suspension member, passing through one of said apertures, and connected with said supporting structure.

5. In a vibration-damping suspension, the combination of a supporting structure; a suspended structure provided with a circumferential groove, semi-circular in cross-section; a cover plate removably attached to said suspended structure and having a plurality of apertures and a circumferential groove, semi-circular in cross-section, the grooves being so designed and related when the cover is attached that they co-operate to form a circumferential channel, circular in cross-section; a plurality of suspension members mounted in said channel, each member comprising a sleeve having a rectilinear bore, and an exterior enlarged portion on each end, each of said portions being so formed that its entire surface contacts the walls of said channel, when the member is mounted in the channel, a rectilinear bolt in the bore of said sleeve, the longitudinal axes of the bore and the bolt co-inciding and being tangent to the circle concentric with the circumferential channel and passing through the center of the circular cross-section of the channel, and a pair of rubber collars slidably mounted on said bolt and bearing on said sleeve; and a carrier bolt connected with the bolt of each suspension member, passing through one of said apertures and connected with the supporting structure.

HANS JOACHIM SEIDEL.
ADOLF WEILER.